United States Patent Office 3,458,552
Patented July 29, 1969

3,458,552
PROCESS FOR THE PREPARATION OF CONDENSED MIXED METAL ALCOHOLATES
Gerhard F. Hauck, Ranzel-Kolonie, Karl W. Hass, Niederkassel, and Arnold Lenz, Cologne-Stammheim, Germany, assignors to Dynamit Nobel Aktiengesellschaft, Troisdorf, Bezirk Cologne, Germany
No Drawing. Filed Dec. 23, 1964, Ser. No. 420,824
Claims priority, application Germany, Dec. 23, 1963, D 43,248
Int. Cl. C07f 5/06, 5/02, 7/22
U.S. Cl. 260—448        13 Claims

ABSTRACT OF THE DISCLOSURE

A process for preparing condensed mixed metal alcoholates of the formula $Me^x(OR)_x$ wherein Me is a metal of the 3rd main group or the 4th sub group of the periodic table, R is an aliphatic, cycloaliphatic, aromatic or alkyl aromatic radical and $x$ designates the valency of the metal Me, with the stoichiometric amount of water required for hydrolyzing the same. The condensed mixed metal alcoholates thus produced are novel compounds, at least two different metal atoms being present.

---

This invention relates to the preparation of condensed, mixed metal alcoholates of metals of the 3rd and 4th main group and the 4th sub-group of the periodic table and is completely concerned with the preparation of condensed, mixed metal alcoholates of at least two metal alcoholates, each of the formula $Me^x(OR)_x$ wherein Me is a metal of the 3rd and 4th main groups and the 4th sub-group of the periodic table.

It is known that condensed metal alcoholates can be prepared from simple metal alcoholates by hydrolysis thereof with stoichiometric quantities of water. In the known process following the addition of a specified quantity of water, so-called "condensed metal alcoholates" form, in which the metal atoms are cross-linked bidimensionally or tridimensionally with one another by oxygen linkages. The degree of condensation of the metal alcoholates can be adjusted by variation of the amount of water used. Metal alcoholates of a low degree of condensation are generally readily soluble in a number of solvents. The viscous solutions which are thus produced from alkoxy-metal-oxypolymers find many applications; for example, the polymeric titanium alcoholates are excellent hardeners for resins.

It is an object of this invention to provide a method for making condensed, mixed metal alcoholates.

It is another object of this invention to provide a method whereby mixed, metal alcoholates are condensed with the different metal atoms forming bidimensional and tridimensional cross-linkages via oxygen atoms.

Another object of the invention is to provide new condensed metal alcoholates characterized by the presence therein of more than one metal of the 3rd and 4th main group and 4th sub-group of the periodic table.

Other objects will become apparent from the description and claims which follow.

These and other objects are attained by means of the invention where it was surprisingly found that condensed, mixed metal alcoholates could be readily prepared by contacting a mixture of at least two metal alcoholates of the formula $Me^x(OR)_x$ wherein Me is a metal of the 3rd and 4th main group and the 4th sub-group of the periodic table, R is an aliphatic, cycloaliphatic, aromatic or fatty aromatic radical and $x$ designates the valency of the metal Me, with the stoichiometric amount of water required for hydrolyzing the same.

The process embodying the invention is applicable for condensing metal alcoholates, including metals of the 3rd and 4th main group and the 4th sub-group of the periodic table. Suitable starting materials for the process of the invention are metal alcoholates which correspond to the formula $Me^x(OR)_x$, wherein Me is a metal of one of the above-mentioned groups of the periodic table, $x$ designates the valency of the metal Me and R is an aliphatic, cycloaliphatic, aromatic or fatty aromatic radical and includes straight-chain and branched-aliphatic radicals, such as methyl, ethyl, n-propyl, i-propyl, n-butyl, i-butyl, pentyl, hexyl, heptyl, octyl, nonyl, decyl, undecyl, or dodecyl, and the like; cycloaliphatic radicals, such as cyclopentyl, cyclohexyl, cycloheptyl, cyclooctyl, methylcyclopentyl, ethylcyclopentyl, methylcyclohexyl, ethylcyclohexyl, and the like. In addition, methyl alcoholates wherein R designates an alkenyl radical, such as propenyl, butenyl, pentenyl, hexenyl, and the like, are also suitable for the process of the invention. R can additionally designate an aromatic radical, such as a phenyl or substituted phenyl, for example, benzyl, xylyl, naphthylethyl or naphthylpropyl, as well as styryl.

In carrying out the process of the invention for the preparation of condensed, mixed alcoholates, a distinction must be made between two embodiments:

Embodiment 1: The different metal alcoholates employed as starting materials have the same speed of hydrolysis;

Embodiment 2: The different metal alcoholates employed as starting materials have different rates of hydrolysis.

The preparation of the condensed, mixed metal alcoholates can be carried out in the first embodiment simply by contacting the starting metal alcoholates with the stoichiometric quantity of water.

This procedure, however, is not applicable in the embodiment of metal alcoholates having different rates of hydrolysis. The difficulty in the preparation of condensed, mixed metal alcoholates having different hydrolysis rates is based on the finding that one of the metal alcoholates in the mixed reaction mixture undergoes essentially a mono-condensation, and the resulting condensation product contains metal atoms of only one type, while the second starting metal alcoholate remains substantially unchanged and can be removed unaltered from the reaction mixture by distillation.

According to another embodiment of the invention, it has now been found that condensed, mixed metal alcoholates can be obtained from metal alcoholates having different rates of hydrolysis if the condensation is effected in the presence of a small amount of a metal alcoholate of a metal of the 4th sub-group of the periodic table, such as titanium and zirconium as catalyst. With the addition of, for example, 1 wt. percent of isopropyl titanate or of 1 wt. percent of n-butyl zirconate to the reaction mixture containing a mixture of metal alcoholates, mixed alcoholates having different degrees of condensation, such as silicon-aluminum, boron-silicon, and tin-aluminum alcoholates, and the like, can be obtained in the presence of varying amounts of water. More highly condensed products would probably correspond approximately to the following formula, for example:

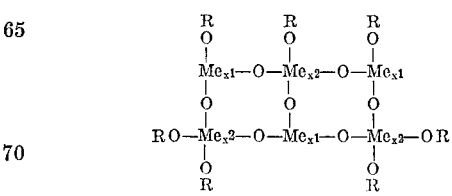

wherein $Me_{x1}$ and $Me_{x2}$ can be metals of the 3rd and 4th main groups and of the 4th sub-group of the periodic system [1] as for example aluminum and boron, silicon, germanium and tin, and titanium and zirconium.

This result was wholly unexpected since ordinarily the combination of these different types of metal alcoholates gave monocondensation products of one rather than mixed polycondensation products of the different metal alcoholates.

The number of metal atoms linked to one another can amount to 2 and more. Condensed, mixed metal alcoholates which can meet the requirement of solubility (subsequent applications) are limited in their size by this requirement. The solubility of these products can be adapted to these various applications by variation of the substituents R.

The amount of water needed for the reaction amounts to a maximum of 1 mol of water per Me-OR bond, i.e., a maximum of 4 mols in the case of tetravalent metals or 3 mols in the case of trivalent metals. Metal alcoholates which tend to form hydroxides require considerably less water. The amount of water varies according to the type of metal alcoholate combination used and according to the desired degree of condensation in the final product. For example, in the case of a silicon-aluminum alcoholate, the water limit is 1 mol of $H_2O$ to 2 mols of metal alcoholate, and in the case of a titanium-aluminum alcoholate, it is 1.3 mols of $H_2O$ to 2 mols of metal alcoholate.

The formation of the condensed, mixed metal alcoholates can be established both directly and indirectly by experimentation. For example, in the case of silicon-aluminum alcoholate, a mixed alcoholate can be distilled out, which has one silicon atom to one aluminum atom. The indirect experimental proof is obtained by different application-related tests. For example, sintered bodies with outstanding mechanical properties can be made with the condensed, mixed metal alcoholates. If, however, the metal alcoholates used were subjected each by itself to hydrolysis and then mixed for use in the same proportions, strengths can be achieved which are inferior to those of the condensed, mixed metal alcoholates. Another indirect proof is the analysis of precipitated alcoholates. It can be calculated from the analysis values that the metals $Me_1^{x'}$ and $Me_2^{x''}$ in the precipitates are in a simple stoichiometric ratio to one another.

The addition of the quantity of water necessary for the hydrolysis is best effected in an appropriate inert diluent, so as to avoid the formation, due to local excessive concentration of water, of metal hydrates or metal hydroxides, which then, due to their poor solubility in the condensed, mixed metal alcoholates, would more or less greatly turbidify the product, or, in some cases, even cause precipitate in the course of storage. Suitable inert solvents for the process of the invention include all those solvents which are inert to the metal alcoholates under the conditions of the reaction, and include by way of example: the low-boiling alcohols such as methanol, ethanol, n- and i- propanol and the like, as well as the low-boiling ketones such as acetone, methyl ethyl ketone and the like. Of course, higher-boiling solvents can also be used as diluents if their presence is not disadvantageous with respect to the later application of the solutions.

The water can also be added directly to a metal alcoholates having a low rate of hydrolysis if the metal alcoholate or alcoholates with the higher rate of hydrolysis are then added with vigorous agitation to the solution or emulsion of the former.

The reaction mixture can be boiled briefly to accelerate the hydrolysis. Metal alcoholates with a low rate of hydrolysis, however, may necessitate longer heating. The application of pressure is generally unnecessary, though in some cases it can be used to advantage.

The products manufactured according to the invention constitute valuable intermediates for use in the ceramic industry.

The invention is illustrated by the following examples of certain preferred embodiments thereof, although it will be understood that the examples are illustrative only and not intended to limit the scope of the invention unless otherwise specifically indicated.

EXAMPLE 1

135 g. aluminum-s-butylate were dissolved with 135 g. tetraethyl silicate in 365 g. isopropanol, with the addition of 4 g. of isopropyl titanate. Thereafter 9.8 g. water was diluted with 365 g. isopropanol and added to the above solution under vigorous agitation. Following a brief boiling period, 800 g. of the isopropanol and of the alcohol produced in the reaction from the metal alcoholates were removed using a vacuum of 50 mm. mercury. 212 g. of a highly condensed silicon-aluminum alcoholate, in which the silicon and the aluminum were in a simple stoichiometric ratio to one another, were thus obtained.

Comparative run (without catalyst)

The above run was repeated with the exception that no isopropyl titanate was added. After the boiling, the resultant solution contained polymeric aluminum-s-butylate, while the alkyl silicate which had been introduced could be recovered, unaltered, by distillation.

EXAMPLE 2

115 g. tri-n-butyl borate (0.5 mol) were dissolved with 104 g. tetraethyl silicate (0.5 mol) and 3.25 g. isopropyl titanate in 500 ml. n-propanol. 9 g. water were then added in admixture with 500 ml. n-propanol, and the resulting mixture was boiled for half an hour with reflux. The diluent and the alcohol which was produced from the alcoholates were removed under vacuum of 50 mm. Hg. 153 g. of a mixed alcoholate, in which boron and silicon were present in a ratio of 3:4 were thereby produced.

Comparative run (without catalyst)

The run just described was repeated; however, the catalyst (isopropyl titanate) was not added. A yield of 115 g. of a mixed silicate in which the boron and silicon atoms were present in a ratio of 5:3 was recovered.

EXAMPLE 3

115 g. tri-n-butyl borate (0.5 mol) and 123 g. of aluminum-s-butylate (0.5 mol) were dissolved in 500 ml. n-propanol with the addition of 3.25 g. isopropyl titanate. 9 g. water were mixed as in Example 2 with 500 ml. n-propanol and slowly added to the borate-aluminate solution. The yield of mixed alcoholate amounted to 175 g.

Comparative run (without catalyst)

The aforesaid run was repeated in the absence of a catalyst. The yield of mixed alcoholate was of the same order of magnitude as in example given above (177 g.).

In both instances, boron and aluminum were present in the condensed, mixed metal alcoholate, in the ratio of 5:4.

EXAMPLE 4

340 g. tetra-n-butyl titanate (1 mol) were dissolved with 208 g. tetraethyl silicate (1 mol) in 1000 ml. n-butanol. 18 g. water were then added in admixture with 500 ml. n-butanol to the above solution under viborous agitation. The mixture was boiled for half an hour with reflux. The n-butanol and the split off alcohol were removed using a vacuum of 15 mm. mercury and a temperature up to 100° C. The yield of a mixed alcoholate amounted to 475 g. Titanium and silicon were present in a ratio of 1:1.

---

[1] The expressions 3rd and 4th main groups and 4th sub-group are more generally known as groups III–a, IV–a and IV–b respectively and as used herein correspond to the listing given in the periodic table of elements as published by Sargent Scientific Laboratories, copyright 1964.

EXAMPLE 5

Example 1 was repeated using 5,4 g. of n-butyl zirconate instead of 4 g. of isopropyl titanate as a catalyst. A similar yield was received.

EXAMPLE 6

To 236 g. tetra-n-butyl stannate, dissolved in 740 ml. n-butanol were added under vigorous agitation at room temperature 195 g. tetra-n-butyl titanate. Thereafter 10.3 g. water, diluted with 500 ml. n-butanol, were slowly added under vigorous agitation. This mixture was boiled for half an hour under reflux. The diluent and the split off n-butanol were removed using a vacuum of 15 mm. mercury and a temperature up to 100° C. The mixed metal alcoholate is a viscous liquid, containing tin and titanium in a molar ratio of 1:1.

EXAMPLE 7

To 236 g. tetra-n-butyl-stannate, dissolved in 740 ml. n-butanol, were added under vigorous agitation at room temperature a mixture of 195 g. tetra-n-butyl titanate and 87 g. tetraethyl silicate. Thereafter 15.45 g. water diluted with 500 ml. n-butanol were slowly added under vigorous agitation. The above mixture was boiled for half an hour under reflux. The diluent and the split off alcohol were removed using a vacuum of 15 mm. mercury and a temperature up to 100° C. The resulting metal alcoholate is a viscous liquid containing tin, titanium and silicon in a molar ratio of 1:1:1.

EXAMPLE 8

420 g. tetraphenyl titanate (1 mol) and 400 g. tetraphenyl silicate (1 mol) were dissolved in 2000 ml. benzene; under vigorous agitation were added at room temperature 18 g. water, dissolved in a mixture of 1000 ml. benzene and 100 ml. ethanol. The resulting mixture was boiled for half an hour under reflux. Thereafter the inert diluents and phenol were removed using a vacuum of 15 mm. mercury and a temperature raising up to 100° C. The resulting mixed metal alcoholate contains titanium and silicon in a molar ratio of 1:1.

EXAMPLE 9

444 g. tetracyclohexyl titanate (1 mol) and 424 g. cyclohexyl silicate (1 mol) were dissolved in 3000 ml. cyclohexanol. 18 g. water were then added in admixture with 1000 ml. cyclohexanol. This mixture was boiled for half an hour under reflux. The diluent and the split off cyclohexanol were afterwards removed using a vacuum of 15 mm. mercury and a temperature raising up to 100° C. The mixed metal alcoholate contains the metals in a molar ratio of 1:1.

We claim:

1. A process for the production of condensed, mixed metal alcoholates, which comprises contacting a mixture of about stoichiometric amounts of at least two metal alcoholates of the formula $Me^x(OR)_x$, wherein Me is a metal selected from the group consisting of group III–a and IV–b of the periodic table of elements, R is a member selected from the group consisting of aliphatic hydrocarbon radicals, cycloaliphatic hydrocarbon radicals, aromatic radicals and alkyl aryl radicals, and $x$ is an integer which equals the valence of Me in the presence of a quantity of water, amounting to a maximum of 1 mole of water per Me-OR bond, and recovering the condensed, mixed metal alcoholate thereby produced.

2. A process according to claim 1, wherein said water is introduced together with an inert diluent.

3. A process according to claim 2, wherein said inert diluent is a member selected from the group consisting of alcohols, ketones and aromatic hydrocarbons.

4. A process according to claim 3, wherein said inert diluent is an alcohol with up to 6 carbon atoms.

5. A process for the production of condensed, mixed metal alcoholates, which comprises contacting a mixture of about stoichiometric amounts of at least 2 metal alcoholates of the formula $Me^x(OR)_x$ wherein Me is a metal selected from the group consisting of group III–a and IV–a of the periodic table of elements, R is a member selected from the group consisting of aliphatic hydrocarbon radicals, cycloaliphatic hydrocarbon radicals, aromatic radicals and alkyl aryl radicals, and $x$ is an integer which equals the valence of Me in the presence of a quantity of water amounting to a maximum of 1 mole of water per Me-OR bond, and a catalytic amount of a metal alcoholate of a metal IV–b group of the periodic table of elements and recovering the condensed, mixed metal alcoholate thus produced.

6. The condensed mixed metal alcoholate produce obtained by the condensation of about stoichiometric amounts of at least two metal alcoholates of the formula $Me^x(OR)_x$, wherein Me is a metal selected from the group consisting of group III–a and IV–b of the periodic table of elements, R is a member selected from the group consisting of aliphatic hydrocarbon radicals, cycloaliphatic hydrocarbon radicals, aromatic radicals and alkyl aryl radicals, and $x$ is an integer which equals the valance of Me in the presence of a quantity of water amounting to a maximum of 1 mole of water per Me-OR bond.

7. The condensed, mixed metal alcoholate produce obtained by the condensation of about stoichiometric amounts of at least two metal alcoholates of the formula $Me^x(OR)_x$ wherein Me is a metal selected from the group consisting of group III–a and IV–a of the periodic table of elements, R is a member selected from the group consisting of aliphatic hydrocarbon radicals, cycloaliphatic hydrocarbon radicals, aromatic radicals and alkyl aryl radicals, and $x$ is an integer which equals the valence of Me in the presence of a quantity of water amounting to a maximum of 1 mole of water per Me-OR bond and a catalytic amount of a metal alcoholate of the formula $Me^x(OR)_x$ wherein Me is IV–b of the periodic table of elements and R and $x$ are as above defined.

8. A process for the production of an aluminum-silicon mixed metal alcoholate which comprises contacting a mixture of about stoichiometric amounts of aluminum-s-butylate and tetraethyl silicate in the presence of a quantity of water amounting to a maximum of 1 mole of water per Me-OR bond in the alcoholate and a catalytic amount of isopropanol titanate, and recovering the condensed aluminum-silicon mixed metal alcoholate thereby produced.

9. A process for the production of condensed boron-silicon metal alcoholate, which comprises contacting a mixture of about stoichiometric amounts of tri-n-butyl borate and tetraethyl silicate in the presence of a quantity of water amounting to a maximum of 1 mole of water per Me-OR bond in the alcoholate and a catalytic amount of isopropyl titanate, and recovering the condensed boron-silicon mixed metal alcoholate thus produced.

10. A process for the production of condensed boron-aluminum mixed metal alcoholates, which comprises contacting a mixture of about stoichiometric amounts of tri-n-butyl borate and aluminum-s-butylate in the presence of a quantity of water amounting to a maximum of 1 mole of water per Me-OR bond in the alcoholate and a catalytic quantity of isopropyl titanate, and recovering the condensed boron-aluminum mixed metal alcoholate thus produced.

11. The condensed, mixed metal alcoholate obtained by the condensation of about stoichiometric amounts of aluminum-s-butylate and tetraethyl silicate in the presence of a quantity of water amounting to a maximum of 1 mole of water per Me-OR bond in the alcoholate and of a catalytic amount of isopropyl titanate.

12. The condensed, mixed metal alcoholate obtained by the condensation of about stoichiometric amounts of tri-n-borate and tetraethyl silicate in the presence of a quantity of water amounting to a maximum of 1 mole of water per Me-OR bond in the alcoholate and a catalytic amount of isopropyl titanate.

13. The condensed, mixed metal alcoholate product obtained by the condensation of about stoichiometric amounts of tri-n-butyl borate and aluminum-s-butylate in the presence of a quantity of water amounting to a maximum of 1 mole of water per Me-OR bond in the alcoholate and a catalytic amount of isopropyl titanate.

References Cited

UNITED STATES PATENTS

| | | | |
|---|---|---|---|
| 2,512,063 | 6/1950 | Kreidl et al. | 260—2 |
| 2,716,656 | 8/1955 | Boyd | 260—429.5 |
| 2,888,475 | 5/1959 | Plueddemann | 260—429.5 |
| 3,013,993 | 12/1961 | Rust et al. | 260—2 |
| 3,087,949 | 4/1963 | Rinse | 260—429.3 |
| 3,178,375 | 4/1965 | Rust et al. | 260—2 |

TOBIAS E. LEVOW, Primary Examiner

H. M. S. SNEED, Assistant Examiner

U.S. Cl. X.R.

106—39; 260—2, 429, 429.3, 429.5, 429.7, 435, 448.8

UNITED STATES PATENT OFFICE
CERTIFICATE OF CORRECTION

Patent No. 3,458,552          Dated July 29, 1969

Inventor(s) Gerhard F. Hauck, Karl W. Hass, and Arnold Lenz

It is certified that error appears in the above-identified patent and that said Letters Patent are hereby corrected as shown below:

Column 6, line 28, "III-a and IV-a" should be --III-a and IV-b--; column 8, line 5, insert --Chemical Reviews, Vol. 61, (1961) pp. 16 and 17--

SIGNED AND
SEALED
JAN 20 1970

(SEAL)
Attest:

Edward M. Fletcher, Jr.
Attesting Officer

WILLIAM E. SCHUYLER, JR.
Commissioner of Patents